(12) United States Patent
Yamamoto et al.

(10) Patent No.: US 7,926,817 B2
(45) Date of Patent: Apr. 19, 2011

(54) SEALING APPARATUS AND BEARING APPARATUS HAVING THE SAME

(75) Inventors: Kazutoshi Yamamoto, Yamatokoriyama (JP); Masahiro Tabata, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 351 days.

(21) Appl. No.: 12/068,307

(22) Filed: Feb. 5, 2008

(65) Prior Publication Data

US 2008/0203670 A1     Aug. 28, 2008

(30) Foreign Application Priority Data

Feb. 6, 2007   (JP) ................. 2007-026846

(51) Int. Cl.
*F16J 15/02* (2006.01)

(52) U.S. Cl. ........................ 277/551; 277/572

(58) Field of Classification Search .................. 277/346, 277/349, 353, 549, 551, 572, 577; 384/484–486
See application file for complete search history.

(56) References Cited

U.S. PATENT DOCUMENTS

| | | | |
|---|---|---|---|
| 3,814,446 A * | 6/1974 | Derman | 277/366 |
| 5,024,450 A | 6/1991 | Hawley et al. | |
| 5,348,312 A | 9/1994 | Johnston | |
| 5,975,534 A * | 11/1999 | Tajima et al. | 277/353 |
| 6,273,428 B1 * | 8/2001 | Sassi | 277/348 |

FOREIGN PATENT DOCUMENTS

| | | |
|---|---|---|
| DE | 25 02 315 A1 | 7/1975 |
| EP | 0 525 288 A1 | 2/1993 |
| EP | 1 628 052 A2 | 2/2006 |
| EP | 1 628 052 A3 | 2/2006 |
| JP | 64-55371 | 4/1989 |
| JP | 2005-37130 | 2/2005 |

* cited by examiner

*Primary Examiner* — Vishal Patel
(74) *Attorney, Agent, or Firm* — McGinn IP Law, PLLC

(57) ABSTRACT

A sealing apparatus includes a slinger which includes a cylindrical portion, and radially-extending portions and provided respectively at axially-opposite ends of the cylindrical portion and an elastic member which includes a base portion fixed to a surface of an inner radially-extending portion of a radially-extending core metal member, and a lip portion connected with the base portion. The lip portion is formed by a first axial lip contacting one radially-extending portion of the slinger and a second axial lip contacting the other radially-extending portion of the slinger. The elastic member is formed such that in an axial cross-section, the distance between a cylindrical portion-opposing surface of the elastic member radially opposed to the cylindrical portion and the cylindrical portion is increasing generally uniformly axially outward.

5 Claims, 8 Drawing Sheets

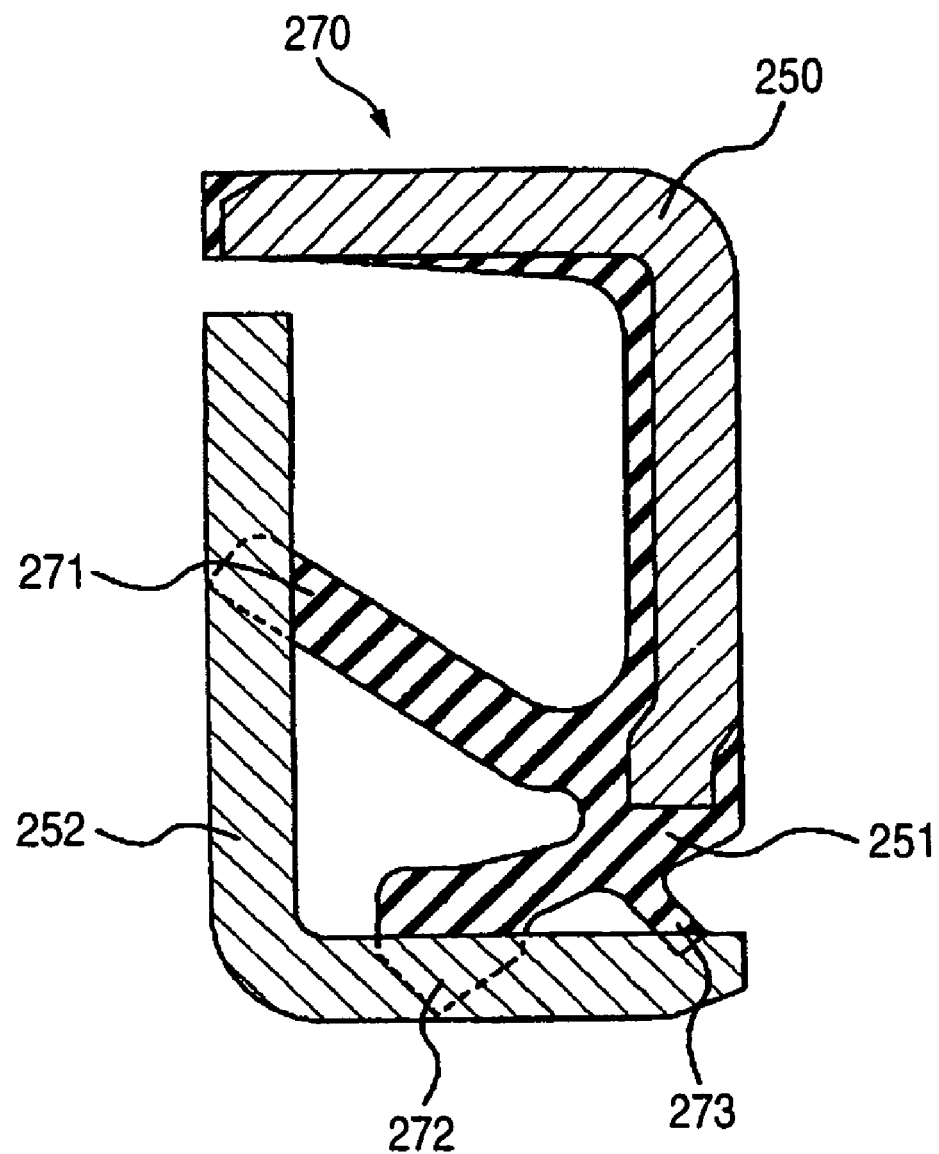

SEALING APPARATUS AND BEARING APPARATUS HAVING THE SAME

BACKGROUND OF THE INVENTION

This invention relates to a sealing apparatus, and more particularly to a sealing apparatus suitably used in a hub unit, a water pump or a motor which serves as a rolling bearing, and a bearing apparatus having the same.

One conventional sealing apparatus is described in JP-UM-A-64-55371.

This sealing apparatus includes a slinger, a core metal portion, and an elastic member.

The slinger has a generally cup-shape in an axial cross-section.

In the above cross-section, the core metal portion bisecting the slinger generally perpendicularly, and extends in a radial direction.

The elastic member includes a base portion, and four thrust lips. The base portion has a generally block-shape, and is fixed to the core metal portion in a manner to cover the periphery of the core metal portion. First two of the four thrust lips are spaced from each other in the radial direction, and extend axially from a portion (which is not a distal end) of the base portion disposed at one axial side of the core metal portion, and contact the slinger generally in the axial direction. The other two of the four thrust lips are spaced from each other in the radial direction, and extend axially from a portion (which is not a distal end) of the base portion disposed at the other axial side of the core metal portion, and contact the slinger generally in the axial direction. An axially-outward portion of a distal end portion of the slinger of the generally cup-shaped cross-section where an opening is provided is bent inwardly perpendicularly relative to the axial direction, and contacts the base portion generally in the axial direction.

In the above conventional sealing apparatus, the slinger and the elastic member are contacted with each other at the five regions in the axial direction, and by doing so, a pressing force applied from the elastic member to the slinger is markedly increased so that even when the positional relation between dust strips and the slinger is varied by a change in axial force of a rotation shaft, a sealing ability will not be lowered.

In the above conventional sealing apparatus, however, the pressing force applied from the elastic member to the slinger is markedly increased, so that a torque is increased, which leads to a problem that fuel consumption of an automobile or the like provided with this sealing apparatus is increased.

Furthermore, the effect of discharging muddy water, passed through the area between the elastic member and the slinger, to the exterior is small, and this invites a problem that there is a possibility that the muddy water passing through first two or three of the five contact regions between the elastic member and the slinger intrudes into the interior through the sealing apparatus.

SUMMARY OF THE INVENTION

It is therefore an object of this invention to provide a sealing apparatus which can reduce a torque, and is excellent in sealing ability, and a bearing apparatus having the same.

The above object has been achieved by a sealing apparatus of the present invention characterized in that the sealing apparatus comprises:

a slinger including a cylindrical portion for being fixed to a peripheral surface of a first bearing ring, a first radially-extending portion extending from one axial end portion of the cylindrical portion toward a second bearing ring in a radial direction of the cylindrical portion, and a second radially-extending portion extending from the other axial end portion of the cylindrical portion toward the second bearing ring in the radial direction;

a core metal member including a fixing portion for being fixed to the second bearing ring, and a distal end portion which is disposed between the first and second radially-extending portions in an axial direction of the cylindrical portion, and is spaced from the cylindrical portion in the radial direction; and an elastic member including a base portion which is fixed to the distal end portion to cover a surface of the distal end portion, and a lip portion disposed in sliding contact with the slinger; and the lip portion comprises a first axial lip which extends from that end portion of the base portion, disposed close to the cylindrical portion, toward the first radially-extending portion to contact the first radially-extending portion, and a second axial lip portion which extends from the base portion toward the second radially-extending portion to contact the second radially-extending portion; and the elastic member has a cylindrical portion-opposing surface which is opposed to the cylindrical portion in the radial direction in spaced relation to the cylindrical portion; and in an axial cross-section of the cylindrical portion, the distance between the cylindrical portion-opposing surface and the cylindrical portion in the radial direction is increasing generally uniformly from the first radially-extending portion toward the second radially-extending portion.

The meaning of the above term "increasing generally uniformly" includes the case where the cylindrical portion-opposing portion includes an axially-extending portion (disposed intermediate the first and second radially-extending portions) at which the distance between the cylindrical portion-opposing surface and the cylindrical portion is constant.

With respect to a sealing apparatus of a so-called pack seal type comprising a core metal member, an elastic member (having two radial lips and one axial lip) and a slinger of an L-shaped cross-section, the inventor of the present invention has studied a magnitude of a torque due to a contact load of each of the lips. As a result, the inventor has found that the torque due to the contact loads of the two radial lips is about 80 percent of the total contact load, and therefore a large proportion of the torque is due to the contact load of the radial seal.

Even with the construction having no radial seal, in the case where a core metal portion extends radially to the vicinity of a cylindrical portion of a slinger, and also lips contact the slinger at two regions, that is, at axially-opposite sides of the core metal portion as in the above-mentioned conventional sealing apparatus, the strength of the elastic portion becomes extremely high, depending on the shape of the core metal member and the shape of the elastic member, and in this case it is obvious that the torque becomes extremely large.

In the present invention, the lip portion comprises only the first axial lip extending from the base portion toward the first radially-extending portion to contact this first radially-extending portion, and the second axial lip extending from the base portion toward the second radially-extending portion to contact this second radially-extending portion. Furthermore, the first axial lip (which is one of the two axial lips) extends from that end portion of the base portion, disposed close to the cylindrical portion, toward the first radially-extending portion, and therefore a pressing force applied from the axial lips to the slinger will not become excessively large. Therefore, the torque can be greatly reduced, and fuel consumption of an automobile or the like provided with this sealing apparatus can be reduced.

Furthermore, in the present invention, the first axial lip extends toward the first radially-extending portion, while the second axial lip extends toward the second radially-extending portion. Therefore, a space formed by the slinger, the first axial lip and the second axial lip can be increased in size, and muddy water once received in this space can be caused to stay in this space for a longer period of time. In addition to this, in the axial cross-section of the cylindrical portion 65, the distance between the cylindrical portion-opposing surface and the cylindrical portion in the radial direction is increasing generally uniformly from the first radially-extending portion toward the second radially-extending portion, and therefore muddy water, once intruded into the space in an operated condition of the automobile or the like provided with this sealing apparatus, can be moved axially along the cylindrical portion-opposing surface in a radially-outward direction by a pumping action of the cylindrical portion-opposing surface, and therefore can be more easily discharged to the exterior. Therefore, the sealing apparatus is provided on the automobile or the like in such a manner that the first axial lip is disposed axially inwardly of the second axial lip, and by doing so, the amount of passing of muddy water from the exterior to the interior through the sealing apparatus can be reduced, so that the sealing apparatus can have the excellent sealing ability.

In one preferred form of the invention, the base portion has a distal end base portion fixed to the distal end portion of the core metal member and projecting from the distal end portion toward the cylindrical portion in the radial direction; and the first axial lip extends from the distal end base portion axially toward the first radially-extending portion and also radially toward the cylindrical portion, while the second axial lip extends from the distal end base portion axially toward the second radially-extending portion and also radially away from the cylindrical portion.

In this preferred form, both of the first and second axial lips extend from the distal end base portion, and the first axial lip is connected to the second axial lip in such a manner that not the core metal member but the distal end base portion is disposed between the first and second axial lips. Therefore, the axial length of the sealing apparatus can be reduced by an amount corresponding to the thickness of the core metal member. Therefore, the sealing apparatus can be made compact.

In the sealing apparatus of the present invention, the torque can be markedly reduced. When the sealing apparatus is mounted in a rolling bearing or the like of the automobile in such a manner that the first axial lip is disposed remoter from the exterior than the second axial lip is, muddy water, passing through the second axial lip and received in the space formed by the first axial lip, the second axial lip and the slinger, can be discharged to the exterior through the second axial lip in a promoted manner, and the sealing apparatus can have the excellent sealing ability.

BRIEF DESCRIPTION OF THE DRAWINGS

FIG. 8 is an enlarged cross-sectional view of the comparative sealing apparatus.

DETAILED DESCRIPTION OF PREFERRED EMBODIMENTS

A preferred embodiment of the present invention will now be described in detail with reference to the drawings.

Figure 1:
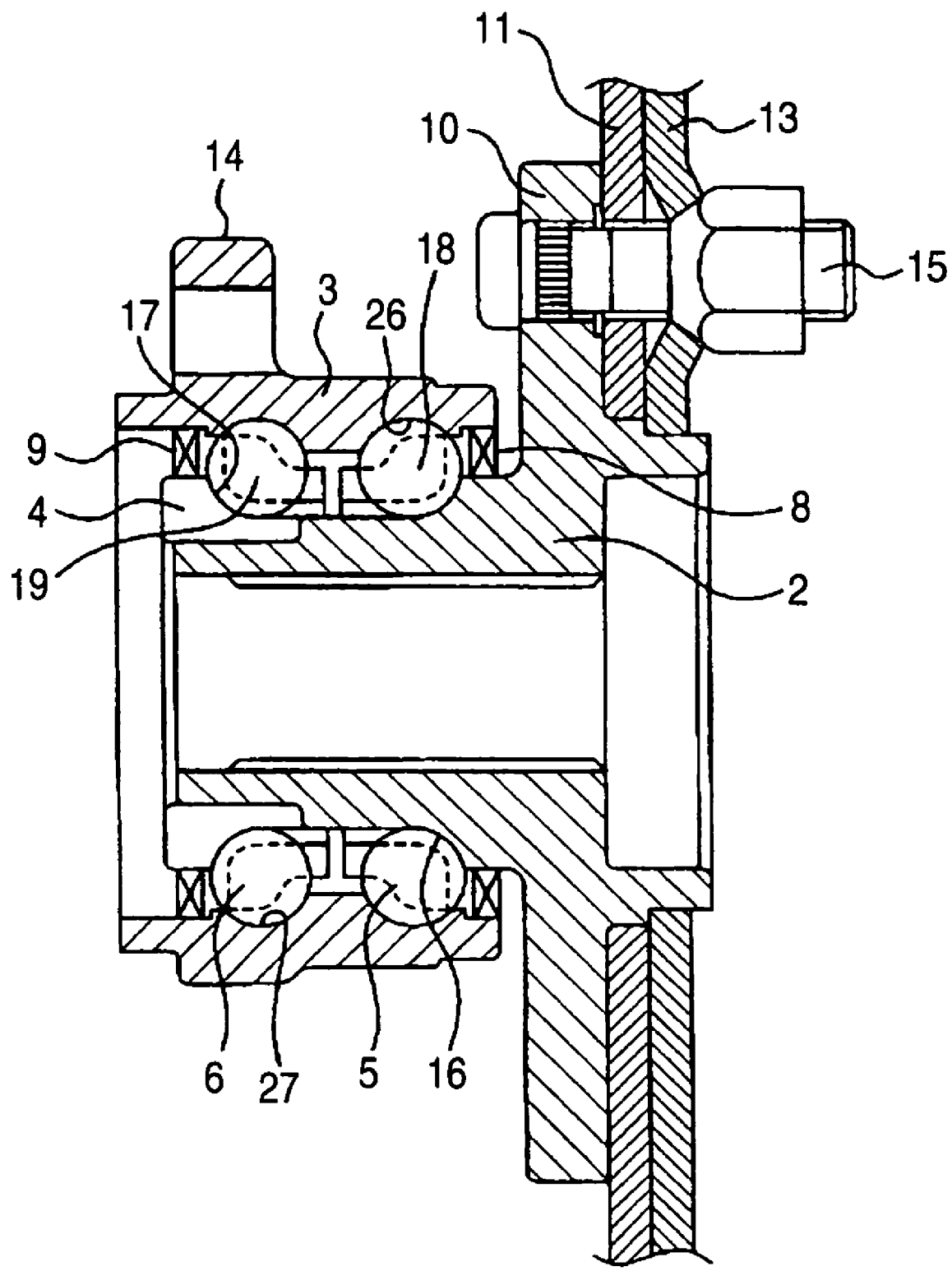
FIG. 1 is an axial cross-sectional view of a hub unit including a first embodiment of sealing apparatuses of the present invention.

FIG. 1 is a cross-sectional view of a hub unit including a first embodiment of sealing apparatuses 8 and 9 of the invention.

This hub unit comprises an inner shaft 2, an outer ring 3 serving as a second bearing ring, an inner ring 4, first balls 5, second balls 6, the first sealing apparatus 8 of the invention, and the second sealing apparatus 9 of the invention.

A brake disk mounting flange 10 of a disk-shape for the mounting of a brake disk 11 thereon is formed at one axial end portion of the inner shaft 2, and extends radially. A plurality of bolt passage holes are formed through the brake disk mounting flange 10, and are arranged in a circle generally concentric with this disk-shaped flange 10. The brake disk 11 is held against the brake disk mounting flange 10, and then a wheel member 13 is held against the brake disk 11, and in this condition the wheel member 13, together with the brake disk 11, is fixed to the brake disk mounting flange 10 by a plurality of bolts 15.

The inner ring 4 is fitted on the other axial end portion of the inner shaft 2, and is fixed thereto. A first raceway groove 16 of the angular contact type is formed in that portion of the inner shaft 2 disposed between the inner ring 4 and the brake disk mounting flange 10, while a second raceway groove 17 of the angular contact type is formed in an outer peripheral surface of the inner ring 4.

The outer ring 3 is disposed in radially opposed relation to the inner shaft 2 in such a manner that this outer ring 3 is spaced from the brake disk mounting flange 10 toward the other end portion of the inner shaft 2. The outer ring 3 has a vehicle body mounting flange 14 formed on an axial end portion thereof remote from the brake disk mounting flange 10, the flange 14 extending radially. A plurality of bolt passage holes are formed through the vehicle body mounting flange 14, and bolts for mounting the vehicle body mounting flange 14 to a vehicle body (knuckles) are inserted respectively into these bolt passage holes. A third raceway groove 26 of the angular contact type and a fourth raceway groove 27 of the angular contact type are formed in an inner peripheral surface of the outer ring 3, and are spaced from each other in the axial direction. The third raceway groove 26 of the angular contact type is disposed closer to the one end portion of the inner shaft 2 than the fourth raceway groove 27 of the angular contact type is.

The plurality of first balls 5 are disposed between the first raceway groove 16 of the inner shaft 2 and the third raceway groove 26 of the outer ring 3, and are held by a cage 18, and are arranged at predetermined intervals in a circumferential direction. The plurality of second balls 6 are disposed between the second raceway groove 17 of the inner ring 4 and the fourth raceway groove 27 of the outer ring 3, and are held by a cage 19, and are arranged at predetermined intervals in the circumferential direction.

The first sealing apparatus 8 is provided between the inner shaft 2 and the outer ring 3, and is disposed in the vicinity of an opening close to the one end portion of the inner shaft 2 (that is, close to the brake disk mounting flange 10). The first sealing apparatus 8 seals or closes the opening of the space between the inner shaft 2 and the outer ring 3 which opening is disposed close to the one end portion of the inner shaft 2. On the other hand, the second sealing apparatus 9 is provided between the inner shaft 2 and the outer ring 3, and is disposed in the vicinity of an opening close to the other end portion of the inner shaft 2 (that is, remote from the brake disk mounting flange 10). The second sealing apparatus 9 seals or closes the opening of the space between the inner shaft 2 and the outer ring 3 which opening is disposed close to the other end portion of the inner shaft 2. The second sealing apparatus 9 has the same structure as that of the first sealing apparatus 8.

Figure 2:
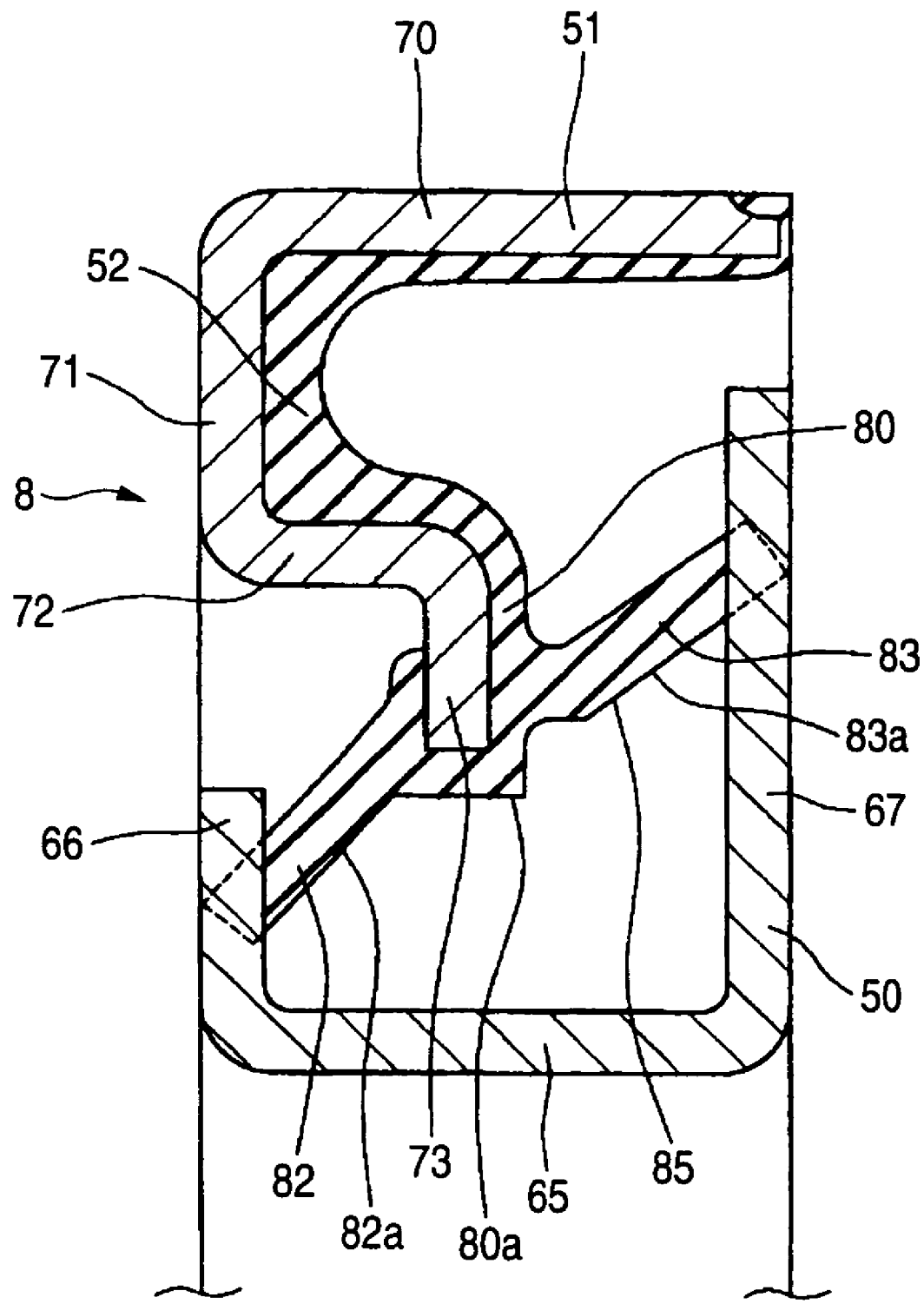
FIG. 2 is a cross-sectional view explaining the structure of the sealing apparatus of the first embodiment in detail.
Figure 3:
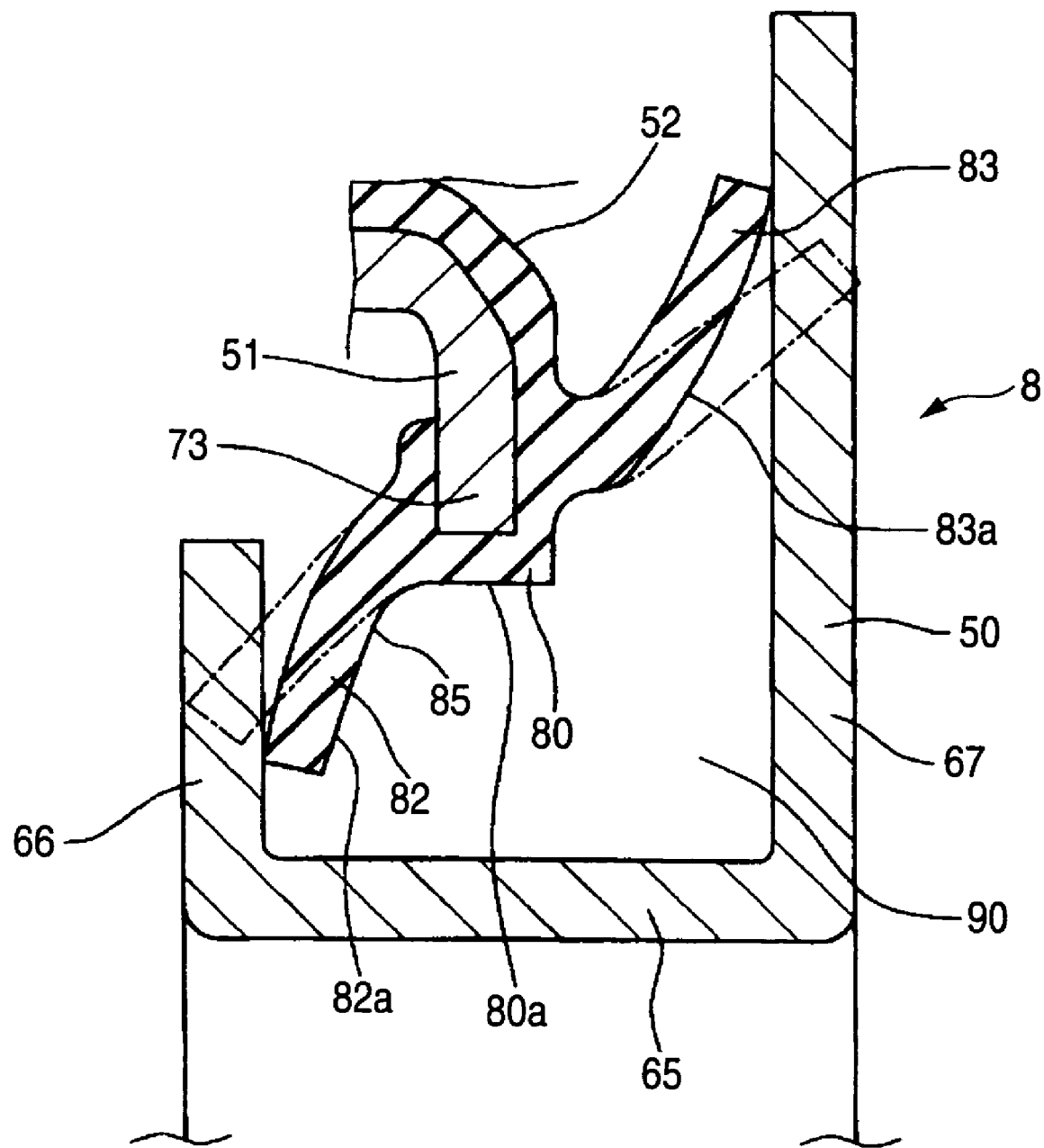
FIG. 3 is a cross-sectional view explaining the structure of the sealing apparatus of the first embodiment in detail.

FIGS. 2 and 3 are cross-sectional views explaining the structure of the first sealing apparatus 8 in detail. More specifically, FIG. 2 is an axial cross-sectional view showing the positional relation between a core metal member 51, an elastic member 52 and a slinger 50 in an assembling position. FIG. 2 shows the position of the elastic member 52, assuming that the elastic member 52 does not receive a force from the slinger 50, that is, the position of the elastic member 52 in a natural state. On the other hand, FIG. 3 is a cross-sectional view of an important portion showing the position of the elastic member 52 and the position of the slinger 50 in a condition in which the elastic member 52 is mounted on the slinger 50. As described above, the second sealing apparatus 9 has the same structure as that of the first sealing apparatus 8. Therefore, the first sealing apparatus 8 will be described below, and description of the second sealing apparatus 9 will be omitted.

As shown in FIG. 2, the first sealing apparatus (hereinafter referred to merely as "sealing apparatus") 8 comprises the slinger 50, the core metal member 51, and the elastic member 52.

The slinger 50 includes a cylindrical portion 65, a first radially-extending portion 66, and a second radially-extending portion 67. The cylindrical portion 65 extends in the axial direction (more specifically, in the axial direction of the inner shaft 2 (see FIG. 1)). The cylindrical portion 65 is fitted on the outer peripheral surface of the inner shaft 2 (serving as the first bearing ring), and is fixed thereto. Incidentally, in the second sealing apparatus 9, the member, corresponding to the first bearing ring to which the slinger is fixed, is the inner ring 4.

The first radially-extending portion 66 extends radially outwardly from an outer peripheral surface of the cylindrical portion 65 at an axial inner end thereof (close to the first balls 5 and the second balls 6 in the axial direction in FIG. 1). On the other hand, the second radially-extending portion 67 extends radially outwardly from the outer peripheral surface of the cylindrical portion 65 at an axial outer end thereof (close to the brake disk mounting flange 10 in the axial direction in FIG. 1, that is, remote from the second sealing apparatus 9).

The core metal member 51 includes a cylindrical fixing portion 70, an outer radially-extending portion 71, an axially-extending portion 72, and an inner radially-extending portion 73. The outer radially-extending portion 71 extends radially inwardly from an inner peripheral surface of the fixing portion 70 of the core metal member 51 at an axial inner end thereof. The axially-extending portion 72 extends axially outwardly from a radially-inner end (or edge) of the outer radially-extending portion 71.

The inner radially-extending portion 73 extends radially inwardly from an axial outer end of the axially-extending portion 72. The inner radially-extending portion 73 forms a radially-inner distal end portion of the core metal member 51. The inner radially-extending portion 73 is disposed between the first radially-extending portion 66 and the second radially-extending portion 67 in the axial direction. The inner radially-extending portion 73 is generally parallel to both of the first radially-extending portion 66 and the second radially-extending portion 67. The inner radially-extending portion 73 is spaced from the cylindrical portion 65 in the radial direction.

The elastic member 52 includes a base portion 80, and a lip portion. The base portion 80 is fixed to the core metal member 51, and covers an outer surface of the core metal member 51. The base portion 80 covers an outer surface of the inner radially-extending portion 73, and has a block-like portion.

The lip portion is held in sliding contact with the slinger 50. The lip portion comprises a first axial lip 82, and a second axial lip 83.

The first axial lip 82 extends radially inwardly and also axially toward the first radially-extending portion 66 from that end portion of the base portion 80 disposed close to the cylindrical portion 65, and contacts the first radially-extending portion 66. On the other hand, the second axial lip 83 extends radially outwardly and also axially toward the second radially-extending portion 67 from the base portion 80, and contacts the second radially-extending portion 67.

The elastic member 52 has a cylindrical portion-opposing surface 85 opposed to the cylindrical portion 65 of the slinger 50 in the radial direction in spaced relation thereto. This cylindrical portion-opposing surface 85 is defined by a radially-inner surface 82a of the first axial lip 82, a radially-inner surface 80a of the block-like portion of the base portion 80 and a radially-inner surface 83a of the second axial lip 83. A predetermined amount of grease comprising mineral oil or PAO as base oil is sealed in a space 90 defined by the first axial lip 82, the base portion 80, the second axial lip 83 and the slinger 50.

In an axial cross-section of the cylindrical portion 65, the distance between the cylindrical portion-opposing surface 85 and the cylindrical portion 65 in the radial direction is increasing generally uniformly from the first radially-extending portion 66 toward the second radially-extending portion 67. More accurately, in this cross-section, the distance between the radially-inner surface 82a of the first axial lip 82 and the cylindrical portion 65 is increasing uniformly from the first radially-extending portion 66 toward the second radially-extending portion 67 over an axial range in which the radially-inner surface 82a of the first axial lip 82 exists, such that the radially-inner surface 82a does not includes any axially-extending portion at which this distance is constant. Further, in the above cross-section, the distance between the radially-inner surface 80a of the block-like portion and the cylindrical portion 65 is constant over an axial range in which the block-like portion exists. Further, in the above cross-section, the distance between the radially-inner surface 83a of the second axial lip 83 and the cylindrical portion 65 is increasing uniformly from the first radially-extending portion 66 toward the second radially-extending portion 67 over an axial range in which the radially-inner surface 83a of the second axial lip 83 exists, such that the radially-inner surface 83a does not includes any axially-extending portion at which this distance is constant.

As shown in FIG. 3, in the condition in which the elastic member 52 is mounted on the slinger 50, the radially-inner surface 82a of the first axial lip 82 is concave when it is seen with respect to the space 90. On the other hand, the radially-inner surface 83a of the second axial lip 83 is convex when it is seen with respect to the space 90. Thus, the second axial lip 83 suppresses the intrusion of a foreign matter (such as muddy water) from the exterior of the sealing apparatus into the space 90 formed by the first axial lip 82, the slinger 50 and the second axial lip 83, and also the ability of restraining the foreign matter (such as muddy water), intruded into the space 90, from intruding into the interior of the hub unit through the first axial lip 82, is enhanced, and furthermore the ability of discharging the foreign matter (such as muddy water), intruded into the space 90, to the exterior through the second axial lip 83 is enhanced.

Figure 4:
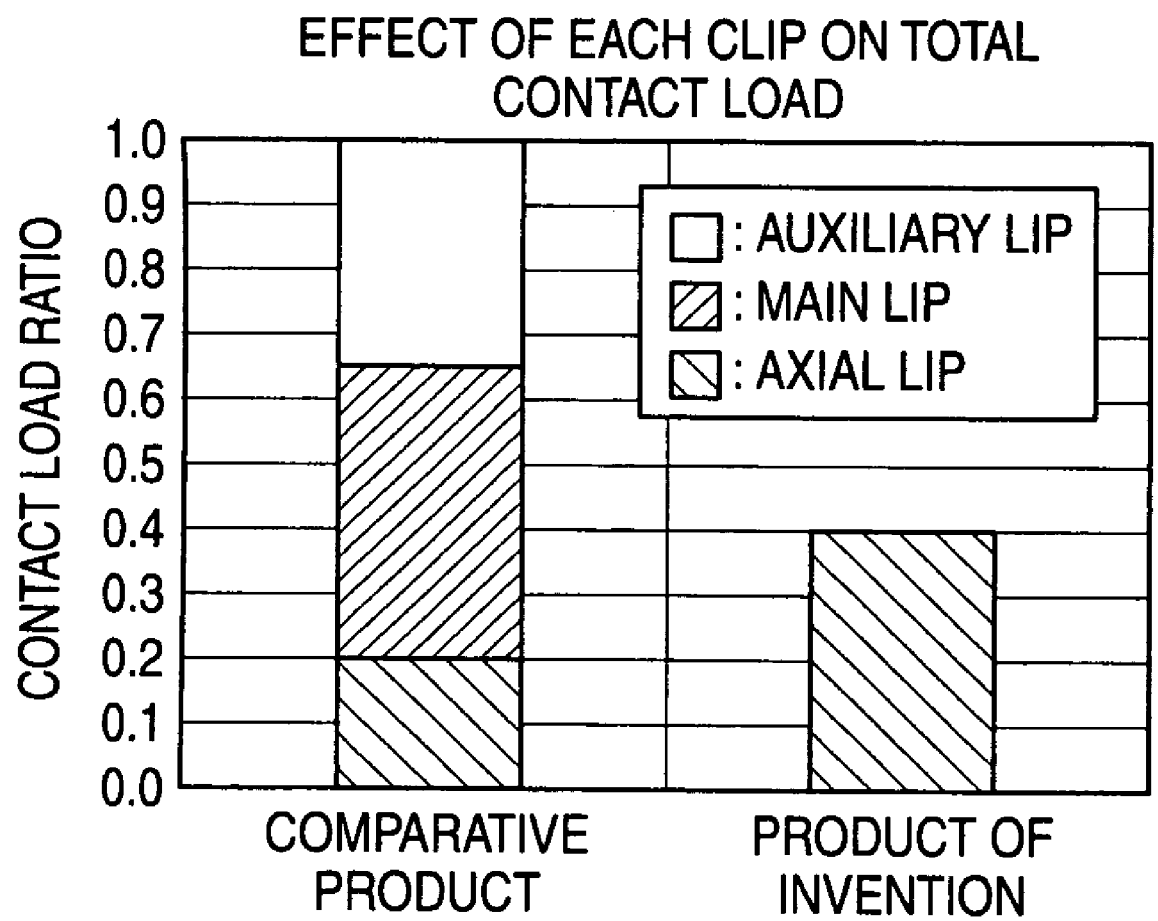
FIG. 4 is a graph with respect to one experimental example in which a comparative sealing apparatus and a sealing apparatus of the first embodiment are prepared, the graph showing the ratio of a contact load of each lip to a total contact load as well as the ratio of the total contact load of the sealing apparatus of the first embodiment to the total contact load of the comparative sealing apparatus in the case where each lip is in a non-worn condition.

FIG. 4 is a graph with respect to one experimental example in which a comparative sealing apparatus and a sealing apparatus of the above first embodiment (indicated as a product of the invention in FIG. 4) are prepared, the graph showing the ratio of a contact load of each lip to a total contact load as well as the ratio of the total contact load of the sealing apparatus of the first embodiment to the total contact load of the comparative sealing apparatus in the case where each lip is in a non-worn condition.

Figure 5:
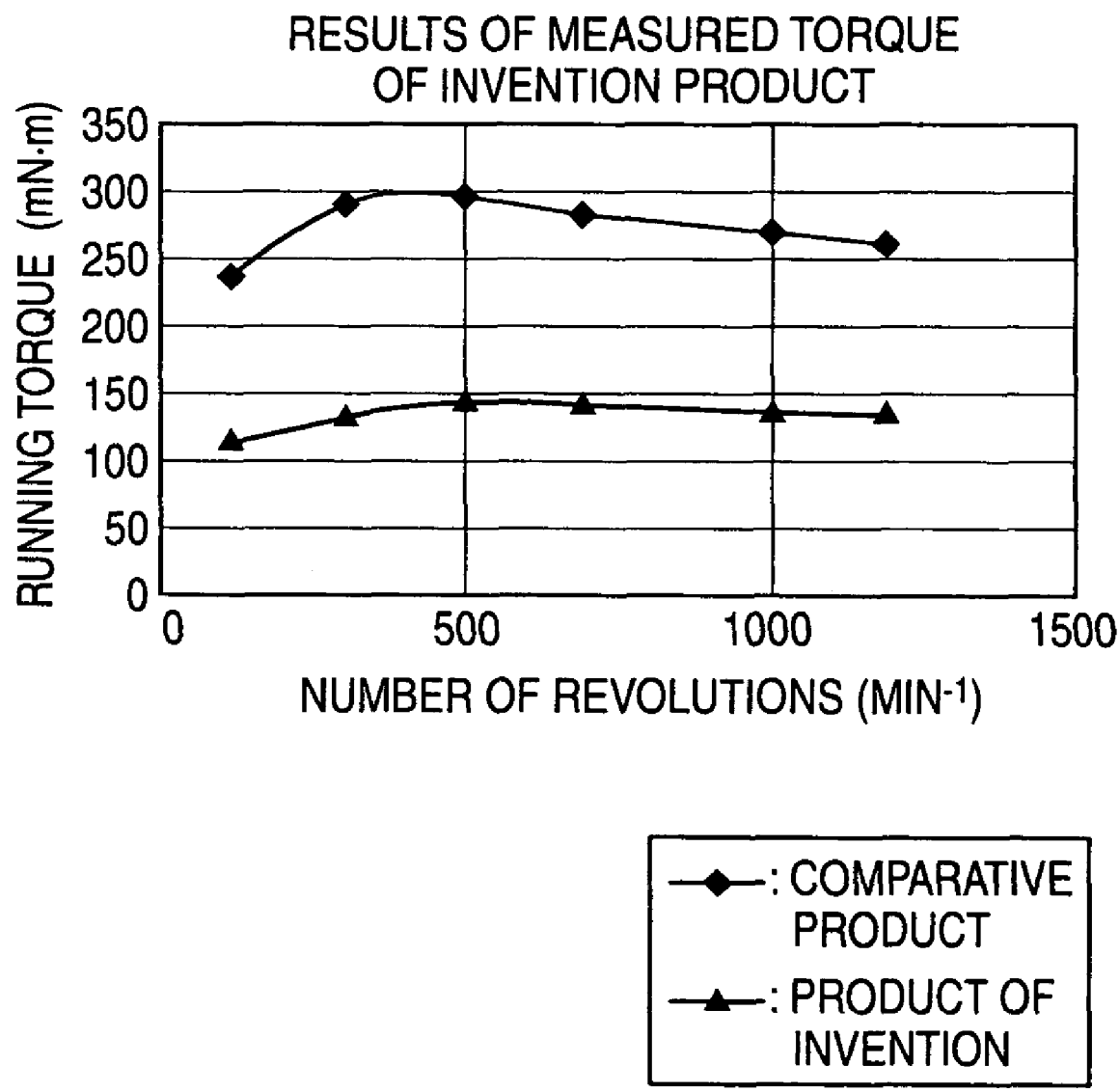
FIG. 5 is a graph showing the relation between the number of revolutions and a running torque with respect to both of the comparative sealing apparatus and the sealing apparatus of the first embodiment indicated as the product of the invention in FIG. 4.

Data shown in FIG. 4 and FIG. 5 are rough data. The inventor of the present invention has confirmed that a sealing apparatus having a lip portion comprising only two axial lips indicates data similar to data indicated by the sealing apparatus of the first embodiment shown as the product of the invention in FIGS. 4 and 5.

The sealing apparatus shown as the comparative product in FIG. 4 is one designated by reference numeral 270 in FIG. 8. This sealing apparatus 270 is a so-called pack seal-type sealing apparatus, and comprises a core metal member 250, an elastic member 251, and a slinger 252 of an L-shaped cross-section. This sealing apparatus 270 includes one axial lip 271, and two radial lips (that is, a main lip 272 and an auxiliary lip 273. FIG. 8 shows the position of the elastic member 251, assuming that the elastic member 251 does not receive a force from the slinger 252, and a portion of the elastic member 251 overlaps the slinger 252 disposed in an assembling position.

As shown in FIG. 4, in the comparative sealing apparatus 270, the sum of the contact loads of the two radial lips is 80 percent of the total contact load, while the contact load of the axial lip is about 20 percent of the total contact load. It will be appreciated from this that a torque can be greatly reduced if the contact loads of the radial lips can be reduced.

In the sealing apparatus of the first embodiment having only two axial lips and having no radial lip, the total contact load thereof is merely 40 percent of the total contact load of the comparative product, and the contact load can be abruptly reduced.

FIG. 5 is a graph showing the relation between the number of revolutions and the running torque with respect to both of the comparative sealing apparatus 270 and the sealing apparatus of the first embodiment.

In the sealing apparatus of the first embodiment, the torque is about 50 percent of the torque in the comparative sealing apparatus over, a wide range from a region where the number of revolutions is small to a region where the number of revolutions is large. Namely, the torque in the sealing apparatus of the first embodiment is abruptly reduced as compared with the comparative product. And besides, the sealing apparatus of the first embodiment exhibits a muddy water resistance which is two to three times enhanced as compared with the comparative sealing apparatus 270. Incidentally, this test was conducted without using a lubricant (grease) in each of the sealing apparatus of the first embodiment and the comparative sealing apparatus 270.

In the sealing apparatus 8, 9 of the first embodiment, the lip portion comprises only the first axial lip 82 extending from the base portion 80 toward the first radially-extending portion 66 to contact this first radially-extending portion 66, and the second axial lip 83 extending from the base portion 80 toward the second radially-extending portion 67 to contact this second radially-extending portion 67. Furthermore, the first axial lip 82 (which is one of the two axial lips 82 and 83) extends from that end portion of the base portion 80, disposed close to the cylindrical portion 65, toward the first radially-extending portion 66, and that portion of the first axial lip 82 connected with the base portion 80 has a portion which does not overlap the core metal member 51 in the axial direction, and therefore a pressing force applied from the axial lips 82 and 83 to the slinger 50 will not become excessively large. Therefore, the torque can be greatly reduced, and fuel consumption of an automobile or the like provided with the sealing apparatuses 8 and 9 can be reduced.

Furthermore, in the sealing apparatus 8, 9 of the first embodiment, the first axial lip 82 extends toward the first radially-extending portion 66, while the second axial lip 83 extends toward the second radially-extending portion 67. Therefore, the space 90 formed by the slinger 50, the first axial lip 82 and the second axial lip 83 can be increased in size, and muddy water once received in this space 90 can be caused to stay in this space 90 for a longer period of time. In addition to this, in the axial cross-section of the cylindrical portion 65 of the slinger 50, the distance between the cylindrical portion-opposing surface 85 and the cylindrical portion 65 in the radial direction is increasing generally uniformly from the first radially-extending portion 66 toward the second radially-extending portion 67, and therefore muddy water, once intruded into the space 90 in an operated condition of the automobile or the like provided with the sealing apparatuses 8 and 9, can be moved along the cylindrical portion-opposing surface 85 in the axial direction toward the second radially-extending portion 67 (toward which the above distance is increasing) by a pumping action of the cylindrical portion-opposing surface 85, and therefore can be more easily discharged to the exterior. Therefore, the sealing apparatus 8, 9 is mounted on a rolling bearing or the like of the automobile in such a manner that the first axial lip 82 is disposed axially inwardly of the second axial lip 83, and by doing so, the amount of passing of muddy water from the exterior to the interior through the sealing apparatus 8, 9 can be reduced, so that the sealing apparatus 8, 9 can have the excellent sealing ability.

In the sealing apparatus 8, 9 of the first embodiment, the radially-inner surface of the first axial lip 82 is concave after the elastic member 52 is mounted on the slinger 50. In the invention, however, the radially-inner surface of the first axial lip may be a conical surface or a convex surface after the elastic member is mounted on the slinger. Also, the radially-inner surface of the second axial lip 83 is convex after the elastic member is mounted on the slinger. In the invention, however, the radially-inner surface of the second axial lip may be a conical surface or a concave surface.

Furthermore, in the sealing apparatus 8, 9 of the first embodiment, in the axial cross-section of the cylindrical portion 65, the distance between the block-like portion of the base portion 80 and the cylindrical portion 65 is constant in the direction from the first radially-extending portion 66 toward the second radially-extending portion 67. In the invention, however, the distance between the block-like portion of the base portion and the cylindrical portion may be increasing in the direction from the first radially-extending portion toward the second radially-extending portion such that the radially-inner surface of the block-like portion does not includes any axially-extending portion at which this distance is constant.

Furthermore, in the above hub unit, one preferred embodiment of the sealing apparatuses 8 and 9 of the invention are disposed respectively in the vicinities of the openings formed respectively at the axial opposite ends of the ball receiving space (the lubricant-sealed space). However, the sealing apparatus of the invention may be disposed only in the vicinity of the opening formed at one axial end of the rolling element (the rolling elements of the hub unit are not limited to the balls, and may be rollers or may include balls and rollers, and in the case of the rollers, although either tapered rollers and cylindrical rollers can be used, it is preferable to use the tapered rollers) receiving space (the lubricant-sealed space). Especially, since the second sealing apparatus 9 according to the embodiment is provided between the inner ring 4 and the outer ring 3, and is disposed in the vicinity of an opening close to the other end portion side where the brake disk mounting flange 10 is not located, the slinger 50 can be attached to the inner ring 4, and a sealing member including the core metal member 51 and the elastic member 52 can be attached to the outer ring 3 without difficulty.

Figure 6:
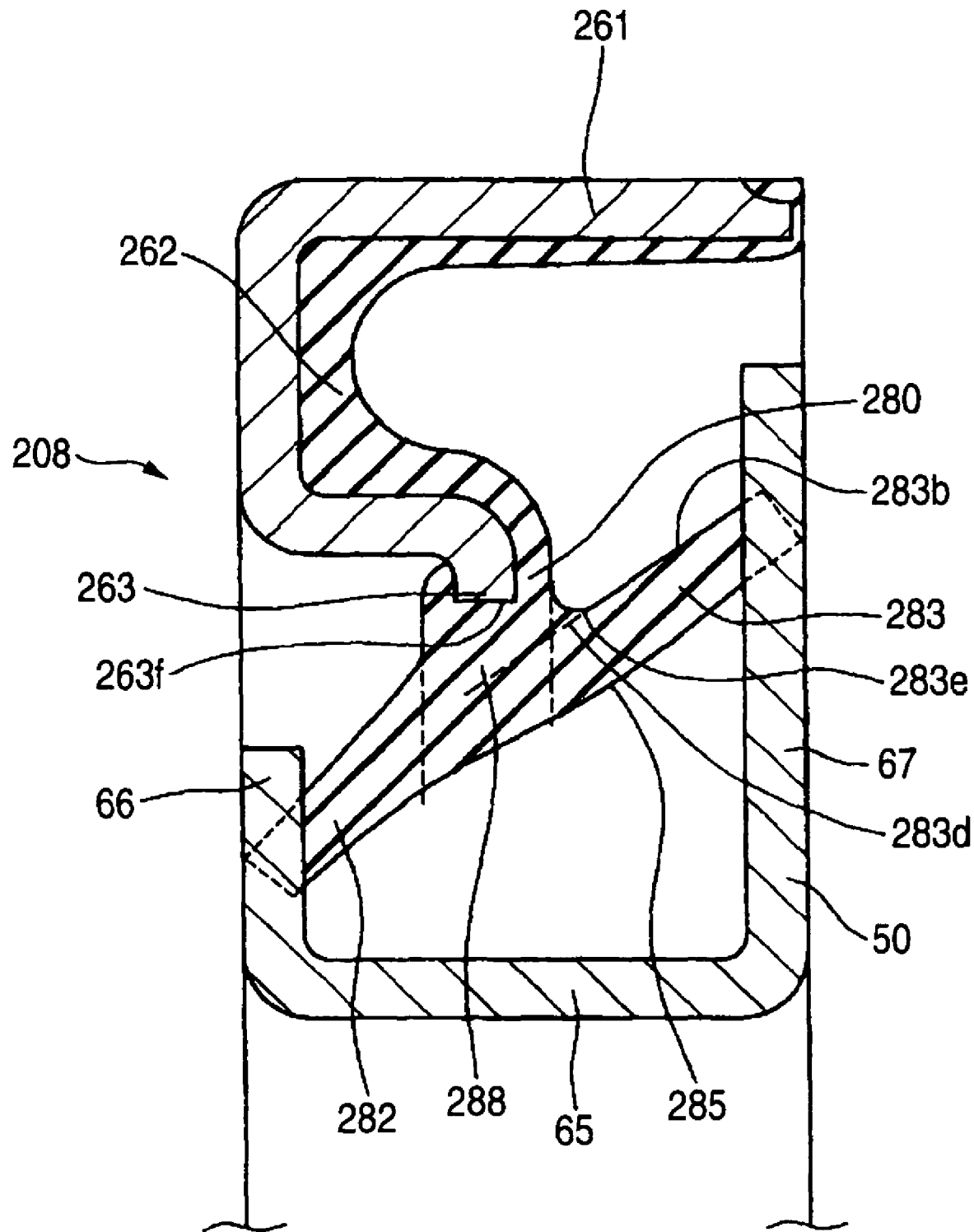
FIG. 6 is a view similar to FIG. 2, but showing a second embodiment of a sealing apparatus of the invention.

FIG. 6 is a view similar to FIG. 2, but showing a second embodiment of a sealing apparatus 208 of the invention.

In the sealing apparatus 208 of the second embodiment, those constituent portions similar to those of the sealing apparatus 8, 9 of the first embodiment will be designated by the identical reference numerals, respectively, and explanation thereof will be omitted. Furthermore, in the sealing apparatus 208 of the second embodiment, description of advantageous effects and modifications similar to those of the sealing apparatus 8, 9 of the first embodiment will be omitted.

In the sealing apparatus 208 of the second embodiment, a radially-inner distal end portion 263 of a core metal member 261 is shorter in radial dimension than that of the first embodiment. That portion (hereinafter referred to as "distal end base portion) 288 of a base portion 280 projecting radially toward a cylindrical portion 65 from the distal end of the core metal member 261 disposed close to the cylindrical portion 65 is larger in radial dimension than that of the first embodiment.

A first axial lip 282 extends axially toward a first radially-extending portion 66 and also radially toward the cylindrical portion 65 from the distal end base portion 288. That portion of the first axial lip 282 connected with the base portion 280 is offset radially from the core metal member 261. In other words, the portion of the first axial lip 282 connected with the base portion 280 does not overlap the core metal member 261 in the axial direction.

A second axial lip 283 extends from the distal end base portion 288 axially toward a second radially-extending portion 67 and also radially away from the cylindrical portion 65. That portion of the second axial lip 283 connected with the base portion 280 is offset radially from the core metal member 261. In other words, the portion of the second axial lip 283 connected with the base portion 280 (that is, the connected portion where an extension of an radially-outer surface 283*b* of the second axial lip 283 intersects the base portion 280) does not overlap the core metal member 261 in the axial direction.

An elastic member 262 has a cylindrical portion-opposing surface (radially-inner surface) 285 facing the cylindrical portion 65 of a slinger 50 and defined by a radially-inner surface of the first axial lip 282, a radially-inner surface of the distal end base portion 288 and a radially-inner surface of the second axial lip 263. This cylindrical portion-opposing surface 285 is formed into a generally conical surface, and in an axial cross-section of the cylindrical portion 65, the distance between the cylindrical portion-opposing surface 285 and the cylindrical portion 65 is increasing from the first radially-extending portion 66 toward the second radially-extending portion 67 such that the cylindrical portion-opposing surface 285 does not includes any axially-extending portion at which this distance is constant.

In the sealing apparatus 208 of the second embodiment, both of the first and second axial lips 282 and 283 extend from the distal end base portion 288, and the first axial lip 282 is connected to the second axial lip 283 in such a manner that not the core metal member 261 but the distal end base portion 288 is disposed between the first and second axial lips 282 and 283. Therefore, the axial length of the sealing apparatus can be reduced by an amount corresponding to the thickness of the core metal member 261. Therefore, the sealing apparatus can be made compact.

In the sealing apparatus 208 of the second embodiment, the first and second axial lips 282 and 283 and the distal end base portion 288 can move generally in unison in the axial direction relative to the core metal member 261. Therefore, even when the slinger 50 and the core metal member 261 are slightly displaced relative to each other in the axial direction, there can be avoided a situation in which a contact pressure at one of the contact portion between the first axial lip 282 and the first radially-extending portion 66 and the contact portion between the second axial lip 283 and the second radially-extending portion 67 becomes excessively large while a contact pressure at the other contact portion becomes unduly small with the result that the sealing ability is lowered.

In the second embodiment, the second axial lip 283 is connected with the base portion 280 in such a manner that at least the connected portion where the imaginary extension surface of the radially-outer surface 283*b* of the second axial lip 283 intersects the base portion 280 does not overlap the core metal member 261 in the axial direction. More preferably, in order that a radially innermost portion 283*e* of a radially-outer surface with which the radially-outer surface 283*b* of the second axial lip 283 and the base portion 280 are continuous will not overlap the core metal member 261 in the axial direction, a distal end surface (radially innermost portion) 263*f* of the distal end portion 263 disposed close to the second axial lip 282 is larger in diameter than the radially innermost portion 283*e* as shown in FIG. 6. With this construction, the first and second axial lips 282 and 283 and the distal end base portion 288 can move generally in unison more smoothly.

Although the sealing apparatuses 8 and 9 of the first embodiment are provided at the hub unit as shown in FIG. 1, the sealing apparatus of the invention can be provided at any other suitable apparatus than such a hub unit.

Figure 7:
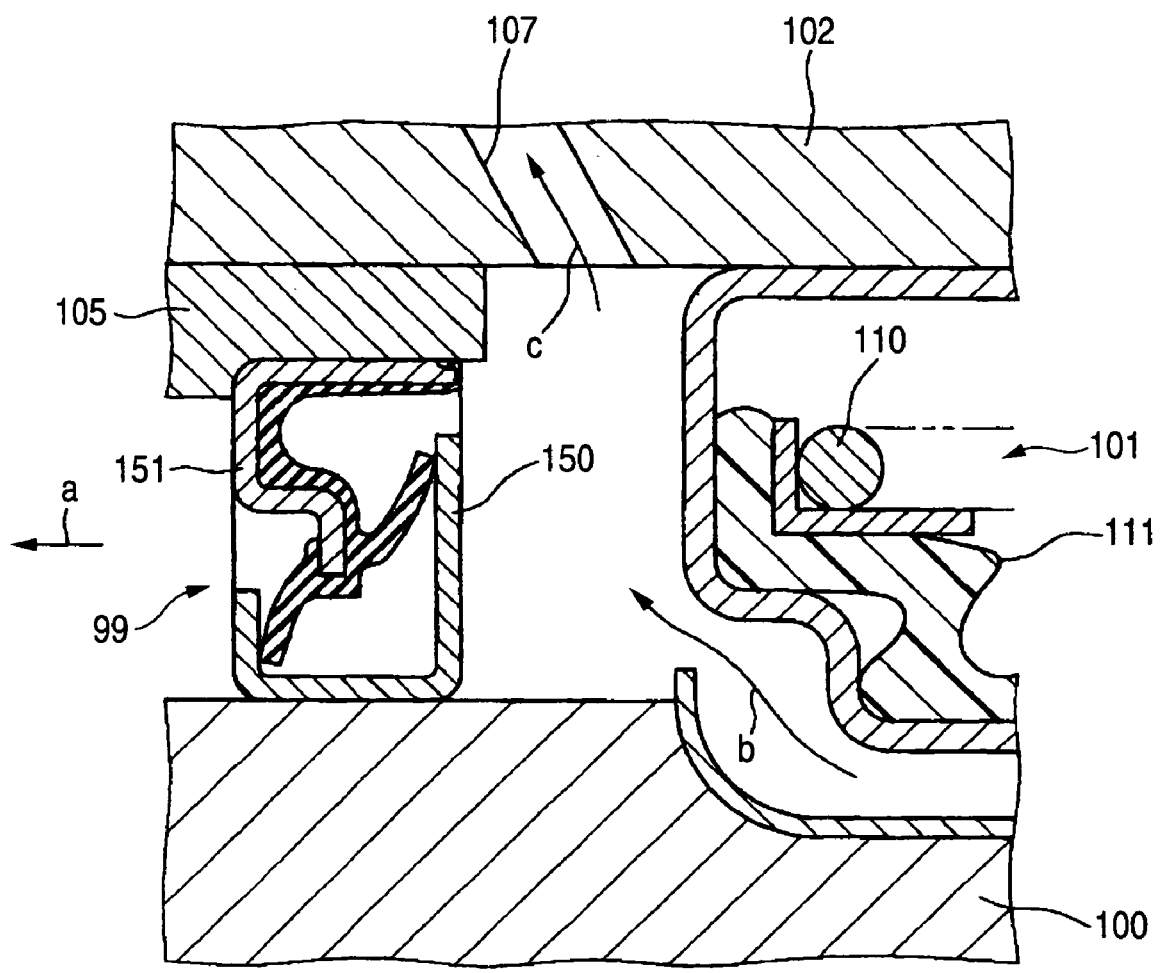
FIG. 7 is an enlarged cross-sectional view of a water pump provided with a sealing apparatus of the invention, showing this sealing apparatus and its vicinities.

FIG. 7 is an enlarged cross-sectional view of a water pump provided with a sealing apparatus 99 of the invention, showing this sealing apparatus 99 and its vicinities.

This water pump comprises a pump shaft 100, a mechanical seal 101, a pump housing 102, an outer ring 105, and the sealing apparatus 99 of the invention. The pump housing 102 has a drain hole 107 formed through a wall of this pump housing 102. The outer ring 105 is fitted in an inner peripheral surface of the pump housing 102, and is fixed thereto.

The pump shaft 100, the outer ring 105 and the sealing apparatus 99 form part of a water pump bearing of the water pump. Namely, although not shown in the drawings, a deep groove-type raceway groove and a cylindrical raceway surface are formed at an inner peripheral surface of the outer ring 105 at that side indicated by arrow a (in FIG. 7), and are arranged in this order from the sealing apparatus 99, and are spaced from each other in an axial direction. On the other hand, a deep groove-type raceway groove and a cylindrical raceway surface are formed at an outer peripheral surface of the pump shaft 100 at that side indicated by arrow a (in FIG. 7), and are arranged in this order from the sealing apparatus 99, and are spaced from each other in the axial direction.

A plurality of balls held by a cage are disposed between the raceway groove of the outer ring 105 and the raceway groove of the pump shaft 100, and are arranged at predetermined intervals in a circumferential direction. A plurality of cylindrical rollers held by a cage are disposed between the cylindrical raceway surface of the outer ring 105 and the cylindrical raceway surface of the pump shaft 100, and are arranged at predetermined intervals in the circumferential direction.

A core metal member 151 of the sealing apparatus 99 is fitted in the inner peripheral surface of the outer ring 105 serving as a second bearing ring, and is fixed thereto, while a slinger 150 of the sealing apparatus 99 is fitted on the outer peripheral surface of the pump shaft 100, and is fixed thereto. The sealing apparatus 99 seals an opening of a space between the outer ring 105 and the pump shaft 100 which opening is disposed adjacent to the mechanical seal 101. With this arrangement, cooling water (stored in a pump chamber) leaking from the mechanical seal 101 in a direction of arrow b is prevented from intruding into the water pump bearing.

The thus leaking cooling water from the pump chamber is positively discharged in a direction of arrow c to the exterior through the drain hole 107 formed in the pump housing 102. In FIG. 7, reference numeral 111 denotes a rubber sleeve of the mechanical seal 101, and reference numeral 110 denotes a coil spring of the mechanical seal 101.

When the sealing apparatus 99 of the invention is provided at such a water pump as shown in FIG. 7, a torque of the water pump bearing in the water pump can be reduced, and fuel consumption of an automobile or the like provided with the water pump can be reduced.

In the above embodiments, the sealing apparatuses (8 and 9) and (99) are provided in the hub unit and the water pump. However, the sealing apparatus of the invention can be provided between a rotor and a stator of a motor, in which case a running cost of the motor can be reduced. Also, when the sealing apparatus of the invention is provided at a rolling bearing of any other suitable unit than the hub unit and the water pump, a torque can be reduced. The sealing apparatus of the invention can be provided in any suitable machine in so far as this machine comprises a first member having an inner peripheral surface, and a second member having an outer peripheral surface, and the first and second members are opposed to each other in a radial direction of the inner peripheral surface of the first member. A running cost of the machine having the sealing apparatus of the invention provided therein can be reduced.

What is claimed is:

1. A sealing apparatus comprising:

a slinger that includes a cylindrical portion to be fixed to a peripheral surface of a first bearing ring, a first radially-extending portion extending from one axial end portion of the cylindrical portion toward a second bearing ring in a radial direction of the cylindrical portion, and a second radially-extending portion extending from the other axial end portion of the cylindrical portion toward the second bearing ring in the radial direction;

a core metal member that includes a fixing portion to be fixed to the second bearing ring, and a distal end portion which is disposed between the first and second radially-extending portions in an axial direction of the cylindrical portion, and is spaced from the cylindrical portion in the radial direction; and an elastic member that includes a base portion fixed to the distal end portion to cover a surface of the distal end portion, and a lip portion brought into sliding contact with the slinger, wherein the lip portion includes a first axial lip which extends from an end portion of the base portion, disposed close to the cylindrical portion, toward the first radially-extending portion to contact the first radially-extending portion, and a second axial lip portion which extends from the base portion toward the second radially-extending portion to contact the second radially-extending portion, wherein surfaces of the first and second axial lips define a cylindrical portion-opposing surface which is opposed to the cylindrical portion in the radial direction in spaced relation to the cylindrical portion, wherein in a natural state of the elastic member, a radial distance between the cylindrical portion-opposing surface and the cylindrical portion is increasing generally uniformly from the first radially-extending portion toward the second radially-extending portion, wherein the base portion includes a distal end base portion fixed to the distal end portion of the core metal member and projecting from the distal end portion toward the cylindrical portion in the radial direction, wherein the first axial lip extends from the distal end base portion axially toward the first radially-extending portion and radially toward the cylindrical portion, and the second axial lip extends from the distal end base portion axially toward the second radially-extending portion and radially away from the cylindrical portion, and wherein the first and second axial lips extend from a point on the base portion of the elastic member radially between the cylindrical portion of the slinger and the distal end portion of the core metal member such that the core metal member is not interposed between the first axial lip and the second axial lip.

2. The sealing apparatus according to claim 1, wherein the cylindrical portion-opposing surface includes a surface of the base portion.

3. The sealing apparatus according to claim 1, wherein, when the elastic member is mounted on the slinger, the first and second axial lips elastically contact the first and second radially-extending portions, respectively, such that the surface of the first axial lip is concave and the surface of the second axial lip is convex.

4. A bearing apparatus for attaching a wheel, comprising:
an inner shaft including a first raceway;
an inner ring that is fixed to the inner shaft and includes a second raceway;
an outer ring including third and fourth raceways;
first rolling elements disposed between the first and third raceways;
second rolling elements disposed between the second and fourth raceways; and
a sealing apparatus according to claim 1, that seals a space where the second rolling elements are disposed between the inner ring and the outer ring,
wherein the slinger is fixed to the inner ring and a sealing member including the core metal member and the elastic member is fixed to the outer ring.

5. The sealing apparatus according to claim 1, wherein the distal end base portion is disposed radially between the cylindrical portion of the slinger and the distal end portion of the core metal member.

* * * * *